United States Patent Office 3,296,305
Patented Jan. 3, 1967

3,296,305
PROCESS FOR 2,2-DIARYL-N-SUBSTITUTED ACETAMIDES
William von E. Doering, Hamden, Adnan A. R. Sayigh, North Haven, and James Noel Tilley, Cheshire, Conn., assignors to The Upjohn Company, Kalamazoo, Mich., a corporation of Delaware
No Drawing. Filed Mar. 4, 1965, Ser. No. 437,303
9 Claims. (Cl. 260—558)

This invention relates to an improved process for the preparation of N-substituted amide and is more particularly concerned with an improved process for the preparation of 2,2-diaryl-N-substituted-acetamides and 2,2-diaryl-N,N-disubstituted-acetamides.

2,2-diaryl-N-substituted-acetamides and 2,2-diaryl-N,N-disubstituted-acetamides are known in the art and are useful for a variety of purposes. For example, they are known to be useful as herbicides, e.g., Chem. Ind. (London) 552–3 (1961); as larvicides, e.g., Chemical Abstracts 43, 1144 (1949); and as chemical intermediates for the production of compounds with useful therapeutic properties, e.g., U.S. Patent 2,009,144. The prior art methods for producing these compounds, e.g., Ann. Chem. 356, 81–6 (1907); Chemical Abstracts 54, 17157–8 (1960); J. Am. Chem. Soc. 74, 763–5 (1952); Swiss Patent 184,987; and German Patent 683,801; are not suitable for economical, large scale production.

The novel process of this invention, in its broadest aspect comprises heating a mixture comprising a primary or secondary amine, a member selected from the group consisting of 1,1-diaryl-2,2,2-trihaloethanes and 1,1-diaryl-2,2-dihaloethylenes, a base selected from the group consisting of alkali metal alcoholates, and alkaline earth metal alcoholates, and a dialkyl carbonate $(RO)_2CO$ (I) wherein R is a alkyl. Preferably the alkyl groups in the carbonate (I) contain from 1 to 8 carbon atoms inclusive.

Use of a primary amine in the process of the invention leads to production of a 2,2-diaryl-N-monosubstituted-acetamide while use of a secondary amine leads to production of a 2,2-diaryl-N,N-disubstituted-acetamide. In either case the use of the carbonate (I) in the process of the invention gives an increased yield of the desired 2,2-diaryl-N-mono-or di-substituted acetamide compared with that obtained using the identical process but omitting the carbonate (I). In particular by employing the carbonate (I) in the process of the invention the amount of 2,2-diarylacetic acid produced as undesired by-product is reduced significantly compared with the amount of said by-product obtained using the same process but omitting the carbonate (I).

The term "aryl" used in defining the 1,1-diaryl-2,2,2-trihaloethanes and 1,1-diaryl-2,2-dihaloethylenes employed in the process of the invention includes unsubstituted and substituted organic moieties which have substantial aromatic character, for example, as discussed by Royals in "Advanced Organic Chemistry," Prentice-Hall, Inc., New York, chapter 5 (1954). Examples of unsubstituted aryl are phenyl, 1-naphthyl, 2-naphthyl, and the isomeric forms of diphenylyl, terphenylyl, phenanthryl, anthryl, furyl, thienyl, pyridyl, quinolyl, and the like. A large variety of substituents can be present on these exemplary moieties and substituted moieties are included in the term aryl. Examples of such substituents are alkyl, e.g., methyl, ethyl, butyl, hexyl, decyl, alkenyl, e.g., vinyl, allyl, crotyl, 5-hexenyl; alkoxy, e.g., methoxy, ethoxy, isopropoxy, pentyloxy; halogen, e.g., fluorine and chlorine; alkylthio, e.g., methylthio, isobutylthio, heptylthio; and the like. One or more than one substituent can be present on an aryl moiety and when more than one is present, the substituents can be alike or different. The two aryl moieties in each 1,1-diaryl-2,2,2-trihaloethane or 1,1-diaryl-2,2-dihaloethylene reactant can be alike or different.

It is preferred that an aryl moiety not contain substituents reactive with the base used as a reactant in the novel process of this invention. For example, it is likely that an alkoxycarbonyl or a cyano substituent would be transformed to a carboxylate salt substituent by reaction with the base. As will be apparent to those skilled in the art, however, an amide will usually be produced even when base-reactive substituents are present if sufficient additional base is present in the reaction mixture.

Especially preferred as aryl moieties in 1,1-diaryl-2,2,2-trihaloethanes and 1,1-diaryl-2,2-dihaloethylenes are phenyl, alkylphenyl, and halophenyl. Examples of alkylphenyl are the isomeric forms of tolyl, xylyl, ethylphenyl, isopropylphenyl, trimethylphenyl, and the like. Examples of halophenyl are the isomeric forms of fluorophenyl, chlorophenyl, dichlorophenyl, trichlorophenyl, and the like.

Substantially all primary and secondary amines can be used in the novel process of this invention. For example, the amine can be entirely aliphatic i.e., free of ring moieties, or it can be, at least in part, alicyclic, aromatic, heterocyclic, or any combination of these. The amine reactant can contain a plurality of primary and/or secondary amino moieties, and one or more than one of the amino moieties in such a reactant can enter into the novel process of this invention. The only limitations with regard to the suitability of an amine are that the amine be at least as basic as water and that it not undergo gross decomposition during the relatively mild thermal and basic conditions of the novel process of this invention. By the term "gross decomposition" is meant deep-seated structural change involving substantially complete breakdown of the amine into substantially smaller molecular and/or atomic fragments. As will be apparent to those skilled in the art, the vast majority of primary and secondary amines satisfy those two criteria.

Although the halogen in the 1,1-diaryl-2,2,2-trihaloethane or 1,1-diaryl-2,2-dihaloethylene can be fluorine, chlorine, bromine, or iodine, 1,1-diaryl-2,2,2-trichloroethanes and 1,1-diaryl-2,2-dichloroethylenes are preferred.

The bases employed in the process of the invention are alkali metal and alkaline earth metal alcoholates. Alkali metals include lithium, sodium, and potassium. Alkaline earth metals include magnesium, calcium, strontium, and barium. Preferred alcoholates are those derived from lower alkanols, e.g., methanol, ethanol, propanol, isopropyl alcohol, tertiary butanol, and the like; lower alkylene glycols, e.g., ethylene glycol, propylene glycol, trimethylene glycol, tetramethylene glycol, hexamethylene glycol, trimethylol propane, and the like; lower-alkoxy-lower alkanols, e.g., the methyl, ethyl, propyl, and butyl monoethers of the above glycols; lower polyoxyalkylene glycols, e.g., diethylene glycol, dipropylene glycol, triethylene glycol, and the like; and mono-lower-alkoxy ethers of lower polyoxyalkylene glycols, e.g., the methyl, etheyl, propyl, and butyl, monoethers of the above polyoxyalkylene glycols.

Although as discussed above, substantially all primary and secondary amines can be used in the novel process of this invention, said process is especially useful in the production of 2,2-diarylacetamides of the formula:

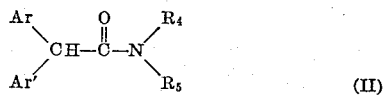

(II)

wherein Ar and Ar' are aryl and wherein $R_4$ and $R_5$ are selected from the group consisting of hydrogen, alkyl, alkenyl, alkynyl, cycloalkyl, aryl, aralkyl, alkoxyalkyl, dialkylaminoalkyl, aryloxyalkyl, and alkylene joined together by a bridge selected from the group consisting of methylene, oxygen, and sulfur, with the provisos that $R_4$ and $R_5$ are not both aryl, that $R_4$ and $R_5$ are not both hydrogen, and that when $R_4$ is alkylene, $R_5$ is also alkylene. Ar and Ar' can be alike or different. Except for the above provisos, $R_4$ and $R_5$ can be alike or different.

Examples of alkyl are methyl, ethyl, propyl, butyl, pentyl, hexyl, heptyl, octyl, nonyl, decyl, undecyl, dodecyl, and isomeric forms thereof. Examples of alkenyl are allyl, 1-methylallyl, 2-methylallyl (methallyl), 2-butenyl (crotyl), 3-butenyl, 1,2-dimethylallyl, 2-ethylallyl, 1-methyl-2-butenyl, 2-methyl-2-butenyl, 3-methyl-2-butenyl, 3-pentenyl, 2,3-dimethyl-2-butenyl, 1,3-dimethyl-2-butenyl, 1-ethyl-2-butenyl, 4-methyl-2-pentenyl, 5-hexenyl, 3-heptenyl, 4-octenyl, 10-dodecenyl, and the like. Examples of alkynyl are 2-propynyl (propargyl), 1-methyl-2-propynyl, 2-butynyl, 3-butynyl, 1-methyl-2-butynyl, 3-pentynyl, 1,2-dimethyl-3-butynyl, 4-pentynyl, 3-hexynyl, 7-octynyl, and the like. Examples of cycloalkyl are cyclopropyl, cyclobutyl, cyclopentyl, cyclohexyl, cycloheptyl, cyclooctyl, and the like, as well as the corresponding alkyl substituted moieties. Examples of aryl include those given above. Examples of aralkyl are benzyl, phenethyl, 1-phenylethyl, 3-phenylpropyl, 4-phenylbutyl, 1-naphthylmethyl, 2-(2-naphthyl)-ethyl, and the like. Examples of alkoxyalkyl are 2-methoxyethyl, 3-methoxypropyl, 2-butoxypropyl, and the like. Examples of dialkylaminoalkyl include 2-dimethylaminoethyl, 2-dibutylaminoethyl, 4-diethylaminobutyl, 10-dimethylaminodecyl, and the like. Examples of aryloxyalkyl are 2-phenoxyethyl, 4-phenoxybutyl, 3-p-tolyloxypropyl, 2-p-chlorophenoxyethyl, 5-(1-naphthyloxy)pentyl, and the like. Examples of alkylene have the following structural formulae: $-CH_2-$, $-CH_2CH_2-$ $-CH(CH_3)-$, $-CH_2CH_2CH_2-$, $-CH_2CH(CH_3)-$, $-CH_2CH(CH_3)CH_2-$, $CH_2CH_2CH_2CH_2-$, $-CH_2CH(CH_3)CH(CH_3)-$ $-CH_2CH_2CH_2CH_2CH_2-$, and the like. Examples of moieties including the nitrogen in Formula I wherein R and R' are alkylene joined together by a bridge selected from the group consisting of methylene, oxygen, and sulfur are 1-azetidinyl, 1-pyrrolidinyl, piperidino, 1-azepinyl, morpholino, thiamorpholino, and the like, as well as the corresponding alkyl substituted moieties.

Primary and secondary amines which can be used as reactants in the novel process of this invention are either known in the art or can be prepared by methods known in the art.

The reactants, 1,1-diaryl-2,2,2-trihaloethanes and 1,1-diaryl-2,2-dihaloethylenes, and the dialkylcarbonates (I) are also either known in the art or can be prepared by methods known in the art.

The novel process of the invention is carried out by bringing together, in any order, the 1,1-diaryl-2,2,2-trihaloethane or 1,1-diaryl-2,2-dihayoethylene, the amine, the base, and the carbonate having the Formula I. Advantageously, but not essentially, the reactants are brought together in the presence of an inert organic liquid diluent. Suitable diluents are those which remain liquid throughout the range of temperature at which the reaction can be conducted (as discussed below) and which do not in any way interfere with the course of the reaction by entering into side-reactions with one or more of the reactants or in any other manner. Preferred diluents are the alcohols corresponding to the alcoholate employed as base in the reaction. In the latter case the alcoholate employed as base can be preformed, or formed in the reaction vessel, by mixing the appropriate metal or the corresponding metal hydride or metal alkyl, with at least an equivalent amount of the appropriate alcohol until reaction is complete. The other reactants are then added to the resulting solution of alcoholate in the diluent alcohol.

Generally speaking the reaction is conducted under substantially anhydrous conditions in order to obtain optimum yields. Thus, it is generally preferred to remove any water from the mixture of base and diluent, for example, by distillation, before adding the other reactants, and to maintain the reaction mixture in substantially anhydrous conditions throughout the heating period.

Although it appears that the 1,1-diaryl-2,2,2-trihaloethane or the 1,1-diaryl-2,2-dihaloethylene and the amine react in substantially equimolecular ratio, an excess of either reactant can be used, if desired. Preferably the amine is present in excess of the stoichiometric proportion and, especially when the amine has a relatively low boiling point and is likely to be lost from the reaction mixture by accidental volatilisation, the amine can be used in proportions up to about 8 moles per mole of trichloroethane or dichloroethylene, or in even higher proportions depending upon the particular reactants, in order to obtain optimum yields of the desired product.

The amount of carbonate having the Formula I which is employed in the process of the invention is advantageously within the range of about 0.5 mole to about 5 moles per mole of 1,1-diaryl-2,2-dihaloethylene or 1,1-diaryl-2,2,2-trichloroethane. Preferably the amount of carbonate (I) employed is within the range of about 1.0 to about 2.0 moles per mole of the 1,1-diaryl-2,2-dihaloethylene or 1,1-diaryl-2,2,2-trichloroethane.

The amount of base employed in the process of the invention is generally of the order of at least 2 equivalents per molecular equivalent of a 1,1-diaryl-2,2-dihaloethylene or at least 3 equivalents per molecular equivalent of a 1,1-diaryl-2,2,2-trihaloethane. If the aryl moieties contain substituents reactive with a base, for example, a carboxyl substituent, the equivalent amount of additional base should be used. Usually, it is preferred to use an excess of base, for example, about twice to four times the minimum amount. A larger excess can be used but usually is not necessary.

After all the reactants and diluent, if one is used, have been combined in the proportions set forth above, the reaction mixture is heated in the range of about 100° C. to about 250° C. until analysis of an aliquot, for example, by infrared spectral analysis, indicates that the reaction has proceeded to completion. Generally speaking the time of heating varies from about 2 hours to about 50 hours depending upon the reactants and conditions employed though shorter or longer reaction times can be employed in certain instances. At temperatures lower than 100° C. the reaction usually proceeds at an inconveniently slow rate. Ordinarily there is no need to heat above about 250° C. and undesirable decomposition of the reactants or the desired amide may occur at higher temperatures. A temperature range of about 140° C. to about 210° C. is usually preferred. It is often advantageous to agitate the reaction mixture using conventional mechanical means during heating. To minimise loss of relatively volatile diluents and amine reactant, it is advantageous to carry out the reaction in a sealed vessel, for example, a metal autoclave.

The desired 2,2-diaryl-N-mono- or disubstituted acetamide can be isolated from the reaction mixture by conventional prcoedures. For example, the reaction mixture can be admixed with water when the desired product generally separates as an insoluble material. In many cases the carbonate (I) is water-soluble and therefore is separated from the desired product by the above aqueous quenching procedure. Where the carbonate (I) is insoluble in water a mixture of said carbonate (I) and the desired product separates as insoluble material in the above aqueous quenching procedure. In certain cases this mixture will also contain unreacted starting material i.e. 1,1-diaryl-2,2-dihaloethylene or 1,1-diaryl-2,2,2-trihaloethane. Such mixtures of desired compound and starting material can be separated by conventional procedures, for example, by trituration with non-polar solvents, such as ligroin, petroleum ether, kerosene and the like, fractional crystallization, chromatography, and like procedures or any combination of these techniques.

One of the by-products obtained in the above described reaction is the diarylacetic acid corresponding to the 1,1-diaryl-2,2-dihaloethylene or 1,1-diaryl-2,2,2-trihaloethane starting material. This acid can be isolated by acidification of the aqueous layer obtained in the above aqueous quenching process. It is found that the amount of the acid by-product formed using the process of the invention is relatively small and is substantially less than the amount isolated if the above process is carried out without the addition of the carbonate (I) to the reaction mixture.

The following examples describe the manner and process of making and using the invention and set forth the best mode contemplated by the inventors of carrying out the invention but are not to be construed as limiting.

*Example 1*

A mixture of 12.5 g. (0.05 mole) of 1,1-dichloro-2,2-diphenylethylene, 11.8 g. (0.1 mole) of diethyl carbonate, a solution obtained by dissolving 3.8 g. (0.165 gram atom) of sodium in 55 ml. of dry diethylene glycol, and a solution of 13.5 g. (0.30 mole) of dimethylamine in 10 ml. of dry diethylene glycol was charged into a 150 ml. stainless steel autoclave. The autoclave was closed and heated at 160° C. for 8 hours. At the end of this time, the autoclave was cooled to 80–100° C. and the excess amine was vented before pouring the contents of the autoclave into 200 ml. of ice-water. The autoclave was rinsed with three 5 ml. portions of ethanol and a total of 50 ml. of water. The resulting aqueous suspension was stirred for a short period before being filtered. The precipitate was washed with water on the filter and then dried in air. The dried precipitate was triturated with three 50 ml. portions of petroleum ether (B.P. 30–60° C.) and dried to give 7.73 g. (65% yield based on total 1,1-dichloro-2,2-diphenylethylene starting material; 91% based on starting material consumed) of $\alpha,\alpha$ - diphenyl - N,N - dimethylacetamide having a melting point of 133.5 to 134° C. The petroleum ether triturates were combined and evaporated to dryness to yield 3.62 g. (29% of theory) of unchanged 1,1-dichloro-2,2-diphenylethylene. The aqueous filtrate from the above working up of the reaction mixture was acidified by the addition of excess conc. hydrochloric acid and the solid which separated was isolated by filtration, washed with water, and dried. There was thus obtained 0.19 g. (1.8% theoretical) of diphenylacetic acid.

The above procedure was repeated except that the diethyl carbonate was omitted from the reaction mixture. The following amounts of material were thus obtained:

$\alpha,\alpha$ - diphenyl - N,N - dimethylacetamide; 5.38 g. (45% based on starting material employed)
1,1 - diphenyl - 2,2 - dichloroethylene recovered; 5.0 g. (40%)
diphenylacetic acid; 1.17 g. (11% theory)

*Example 2*

Using the procedure described in Example 1, but replacing diethyl carbonate by diisopropyl carbonate, there was obtained $\alpha,\alpha$ - diphenyl - N,N - dimethylacetamide in comparable yield.

Similarly, using the procedure described in Example 1, but replacing diethyl carbonate by other dialkyl carbonates such as dibutyl carbonate, di(2-pentyl)carbonate, dihexyl carbonate, dioctyl carbonate, and the like, there was obtained $\alpha,\alpha$ - diphenyl - N,N - dimethylacetamide in comparable yield.

*Example 3*

Using the procedure of Example 1, but replacing dimethylamine by butylamine, there is obtained 2,2-diphenyl-N-butylacetamide.

Similarly, using the procedure of Example 1, but replacing dimethylamine by p-toluidine, piperidine, diethylamine, dihexylamine, diallylamine, N - methylaniline, dicyclohexylamine, dibenzylamine, N - methylpropargylamine, prrolidine, morpholine, N,N' - dimethylethylenediamine, 1,4 - butanediamine, and N,N - diethyl-1,3 - propanediamine, there are obtained 2,2 - diphenyl-N - p - tolylacetamide, 1 - (diphenylacetyl)piperidine, 2,2 - diphenyl - N,N - diethylacetamide, 2,2 - diphenyl-N,N - dicyclohexylacetamide, 2,2 - diphenyl - N,N - diallylacetamide, 2,2 - diphenyl - N - methyl - N - phenylacetamide, 2, 2 - diphenyl - N,N - dicyclohexylacetamide, 2,2 - diphenyl - N,N - dibenzylacetamide, 2,2 - diphenyl-N - propargylacetamide, 1 - (diphenylacetyl)pyrrolidine, 4 - (diphenylacetyl)morpholine, N,N' - ethylene bis [N - methyl - 2,2 - diphenylacetamide], N,N' - tetramethylene bis [2,2 - diphenylacetamide], and 2,2 - diphenyl - N - (3 - diethylaminopropyl)acetamide, respectively.

*Example 4*

Using the procedure of Example 1, but replacing 1,1-dichloro - 2,2 - diphenylethylene by 1,1 - diphenyl - 2,2,2-trichloroethane, there is obtained $\alpha,\alpha$ - diphenyl - N,N-dimethylacetamide in comparable yield.

*Example 5*

Using the procedure described in Example 1, but replacing 1,1 - dichloro - 2,2 - diphenylethylene by 1,1-bis (o - chlorophenyl) - 2,2,2 - trichloroethane, there is obtained 2,2 - bis (o - chlorophenyl) - N,N - dimethylacetamide.

Similarly, using the procedure described in Example 1, but replacing 1,1 - dichloro - 2,2 - diphenylethylene by 2,2 - bis(p - methoxyphenyl) - 1,1 - dichloroethylene, 2,2-bis(1 - naphthyl) - 1,1,1 - trichloroethane, 2,2 - bis(p-nitrophenyl) - 1,1 - dichloroethylene, 2,2 - di - p - tolyl-1,1 - dichloroethylene and 2,2 - bis(m - fluorophenyl) 1,1 - dichloroethylene, there are obtained 2,2 - bis(p-methoxyphenyl) - 2,2 - bis(1 - naphthyl)-, 2,2 - bis(p-nitrophenyl)-, 2,2 - bis(p - tolyl)-, and 2,2 - bis(m-fluorophenyl)-N,N-dimethylacetamide, respectively.

We claim:

1. A process for the preparation of a 2,2-di(Ar)-N-substituted acetamide, wherein each Ar is selected from the class consisting of unsubstituted aryl and alkyl-, alkenyl-, alkoxy-, alkylthio-, and halo-substituted aryl, which comprises reacting a polyhalo member selected from the group consisting of 1,1 - di(Ar) - 2,2 - dihaloethylene and 1,1 - di(Ar) - 2,2,2 - trihaloethane, wherein Ar is as defined above, with an amine selected from the group consisting of primary and secondary amines at a temperature within the range of about 100° C. to about 250° C. and in the presence of (i) a base selected from the group consisting of alkali metal alcoholates and alkaline earth metal alcoholates, said base being employed in an amount of at least one equivalent per halo atom in said polyhalo member, and (ii) from about 0.5 mole to about 5 mole per mole of said polyhalo member of a dialkyl carbonate wherein alkyl is from 1 to 8 carbon atoms, inclusive.

2. A process for the preparation of a 2,2-di(Ar)-N-monosubstituted acetamide wherein each Ar is selected from the class consisting of unsubstituted aryl and alkyl-, alkenyl-, alkoxy-, alkylthio-, and halo-substituted aryl, which comprises reacting a polyhalo member selected from the group consisting of 1,1 - di(Ar) - 2,2 - dihaloethylene and 1,1 - di(Ar) - 2,2,2 - trihaloethane, wherein Ar is as defined above, with a primary amine at a temperature within the range of about 100° C. to about 250° C. and in the presence of (i) a base selected from the group consisting of alkali metal alcoholates and alkaline earth metal alcoholates, said base being employed in an amount of at least one equivalent per halo atom in said polyhalo member, and (ii) from about 0.5 mole to about 5 moles per mole of said polyhalo member of a dialkyl carbonate wherein alkyl is from 1 to 8 carbon atoms, inclusive.

3. A process for the preparation of a 2,2-di(Ar)-N,N-disubstituted acetamide wherein each Ar is selected from the class consisting of unsubstituted aryl and alkyl-, alkenyl-, alkoxy-, alkylthio-, and halo-substituted aryl, which comprises reacting a polyhalo member selected from the group consisting of 1,1 - di(Ar) - 2,2 - dihaloethylene and 1,1 - di(Ar) - 2,2,2 - trihaloethane, wherein Ar is as defined above, with a secondary amine at a temperature within the range of about 100° C. to about 250° C. and in the presence of (i) a base selected from the group consisting of alkali metal alcoholates and alkaline earth metal alcoholates, said base being employed in an amount of at least one equivalent per halo atom in said polyhalo member, and (ii) from about 0.5 mole to about 5 mole per mole of said polyhalo member of a dihalo member of a dialkyl carbonate wherein alkyl is from 1 to 8 carbon atoms, inclusive.

4. A process for the preparation of 2,2-diphenyl-N,N-dimethylacetamide which comprises reacting a polychloro member selected from the group consisting of 1,1-diphenyl - 2,2 - dichloroethylene and 1,1 - diphenyl-2,2,2-trichloroethane with dimethylamine at a temperature within the range of about 100° C. to about 250° C. and in the presence of (i) a base selected from the group consisting of alkali metal alcoholates and alkaline earth metal alcoholates, said base being employed in an amount of at least one equivalent per chloro atom in said polychloro member, and (ii) from about 0.5 mole to about 5 moles per mole of said polychloro member of a dialkyl carbonate wherein alkyl is from 1 to 8 carbon atoms, inclusive.

5. The process of claim 4 wherein the dialkyl carbonate is diethyl carbonate.

6. The process of claim 4 wherein the base is sodium diethylene glycolate.

7. A process for the preparation of 2,2-diphenyl-N,N-dimethylacetamide which comprises reacting 1,1 - diphenyl - 2,2 - dichloroethylene with dimethylamine at a temperature within the range of about 100° C. to about 250° C. and in the presence of (i) an alkali metal alcoholate, the latter being employed in an amount of at least 2 equivalents per mole of 1,1-diphenyl-2,2-dichloroethylene, and (ii) from about 0.5 mole to about 5 moles per mole of 1,1 - diphenyl - 2,2 - dichloroethylene of a dialkyl carbonate wherein alkyl is from 1 to 8 carbon atoms, inclusive.

8. The process of claim 7 wherein the dialkylcarbonate is diethyl carbonate.

9. The process of claim 7 wherein the alkali metal alcoholate is sodium diethylene glycolate.

References Cited by the Examiner

Banti: Gaz. Chim. Ital., volume 59, pages 819–24 (1929).

Saunders et al.: Tetrahedron, vol. 11, pages 1 to 10 (1960).

Webster's Third New International Dictionary pages 116, 120, 125, and 1108 Springfield, Massachusetts, Merriam, 1961.

WALTER A. MODANCE, *Primary Examiner.*

NATALIE TROUSOF, *Assistant Examiner.*